Figure 1:
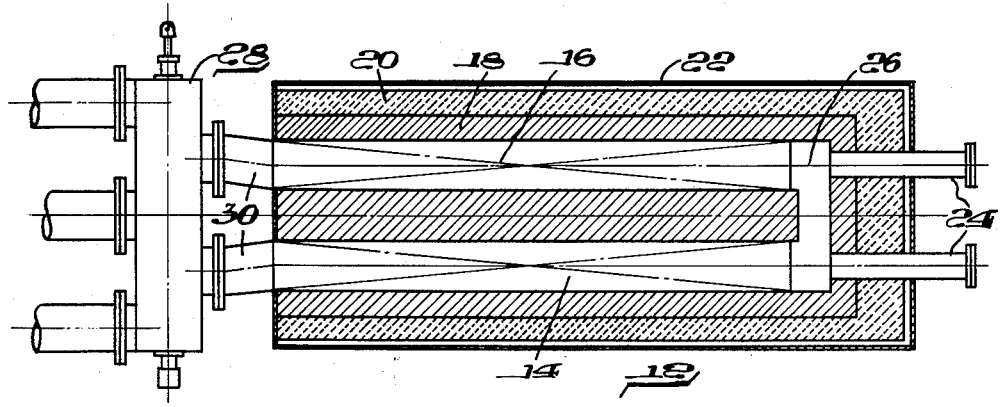

March 13, 1956 R. L. HASCHE ET AL 2,737,970
VALVE CONTROL MECHANISM
Filed Dec. 9, 1952

INVENTORS.
RUDOLPH L. HASCHE
LESLIE F. McCONNELL.
BY Walter J. Monacelli
their

United States Patent Office 2,737,970
Patented Mar. 13, 1956

2,737,970

VALVE CONTROL MECHANISM

Rudolph L. Hasche, Johnson City, Tenn., and Leslie F. McConnell, Birmingham, Ala.

Application December 9, 1952, Serial No. 324,938

7 Claims. (Cl. 137—309)

The present invention relates to an apparatus for controlling the flow of fluid in a system. More specifically the present invention contemplates a novel and improved fluid valve control mechanism useful in furnace operations in which the direction of fluid flow is reversed at selected periodic time intervals.

In the reversal of fluid flow through an apparatus such as the regenerative mass of a furnace, a number of two (2)-way or three (3)-way valves actuated by air or a hydraulic system controlled by a timer have been used to control the direction of fluid flow. In such a system each valve is separately controlled and if one of the valves should stick or otherwise be interrupted in its operation, the entire furnace operation is disrupted with resulting danger to the furnace. Furthermore, such a system is complicated and requires expensive maintenance.

Another alternative apparatus that is used for fluid control is a four (4)-way plug valve. This type apparatus is very expensive, is slow to operate, results in undesirable operational time losses during a fluid flow reversing step and results in pressure surges during the reversing operation. Further, such a valve is not adaptable to use with fluids of a hot gaseous nature.

The present invention assures a continuous flow of fluid from the inlet side of a fluid system to the discharge side, provides efficient, simple and economical operation, and eliminates the disadvantages of the previous mechanisms heretofore mentioned.

More particularly the present invention contemplates a regenerative furnace, said furnace having a regenerative space, a fluid valve control mechanism in communication with said regenerative space to control the flow of fluid in said space, said valve control mechanism comprising a first valve housing having means for communicable connection at one point with said regenerative space, a second valve housing spaced from said first valve housing and having means for communicable connection at a different point with said regenerative space, a first fluid chamber adapted to be selectively connected with said first valve housing, a second fluid chamber adapted to be selectively connected with said second valve housing, a third fluid chamber in common to and positioned between said first and second valve housings for selective connection with said valve housings in alternation and valve means in each of said valve housings adapted to selectively control the flow of fluid in the regenerative space between said first and said second chamber in alternation and the common chamber.

According to another feature of the invention the valve housings and fluid chambers of the valve control mechanism are aligned so that automatic alignment of the valve means is obtained to provide for simple, efficient operation of the valve means and to provide a construction possessing symmetry in reference to the fluid streams entering and leaving the system.

According to still another feature of the invention, the valve discs controlling the direction of fluid flow through the system are actuated by a single actuating member to provide a simple means of coordinate operation of the valve disc members and to assure that one port is open when its coordinating port is closed.

According to another feature of the invention the valve discs are spring pressed against the valve seats when the discs are placed in a closed position to assure positive tightness regardless of any expansion or contraction of the valve members due to temperature changes in the fluid system and to further provide a yieldable safety feature in the event of a blockage in the system with which the valve mechanism is associated.

According to still another feature of the invention, the valve members may be adjusted to assure proper positioning, proper spring pressure against the valve, discs and proper coordination among valve disc members.

According to another feature, sealing members are provided to prevent any leakage of fluid from fluid chambers into adjacent valve housings when communicating ports are closed. And according to still another feature of the invention, guide members are provided on the valve discs to assure proper alignment and contact with respective valve disc seats.

It is obvious that various changes can be made by one skilled in the art in the arrangement, form, construction and type of the various elements disclosed without departing from the scope or spirit of this invention. Thus, for example, stop pins selectably positioned in holes spaced along the actuating member or similarly spaced clamping sleeves may be used instead of the threaded portions and adjustable stop nuts and two or more valve control mechanisms may be aligned to operate two or more synchronized furnaces by one operation.

Reference will now be made to the accompanying drawings which illustrate and exemplify the embodiment of the apparatus of the invention in a preferred type of construction.

Figure 1 discloses the fluid valve control mechanism in combination with the regenerative section of a furnace.

Figure 2:
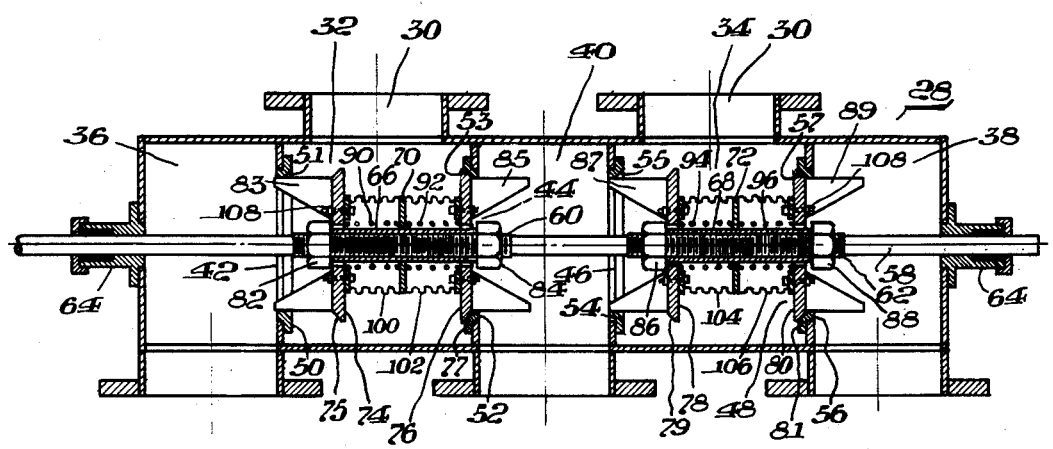

Figure 2 is an enlarged cut away view of the valve control mechanism.

In accordance with the drawings, the reference numeral 12 indicates generally the regenerative section of a furnace which has a hairpin type chamber as shown by reference numeral 14. Positioned within the legs of chamber 14 is a system of tubular checker bricks 16 (shown diagrammatically). The chamber is surrounded by a high temperature fire resistant refractory material 18 and an insulating brick material 20 which also serve as the sustaining walls. A gas sealing metallic shell 22 surrounds the sustaining wall 20. Burners 24 connected with the reaction space 26 of chamber 14 are used to raise the temperature of the furnace to the desired operating range, whereupon they are shut off. The fluid valve control system indicated generally by reference numeral 28 is communicably connected with the hairpin chamber 14 by the conduits 30.

The fluid valve control system 28 which is more clearly shown in Figure 2 of the drawing comprises a first valve housing 32 and a second valve housing 34 spaced from said first valve housing 32 and in alignment therewith. A first fluid chamber 36 is positioned adjacent to and in alignment with the first valve housing 32 on the side most removed from the second valve housing 34. A second fluid chamber 38 is positioned adjacent to and in alignment with the second valve housing 34 on the side most removed from the first valve housing 32. Positioned between valve housings 32 and 34 and in alignment therewith is a third fluid chamber 40. The walls of the valve housings and fluid chambers may be made from any suitable material, preferably of a metallic nature. Aligned ports 42, 44, 46, and 48 are positioned between each valve housing and its adjacent fluid chambers and have positioned therein valve seat members 50, 52, 54, and 56, having tapered seating surfaces 51, 53, 55, and 57. The valve seat members may be made from any suitable metallic material, preferably of a bronze alloy.

Extending substantially through the center of the aligned ports is an actuating rod member 58, having spaced threaded portions 60 and 62 falling substantially within each of the valve housings. The rod is slideably journaled in bearing members 64 positioned on opposite sides of the valve control apparatus 28 and may be reciprocated in its bearings by any desired power actuating means (not disclosed). Sleeves 66 and 68 surround a section of the threaded portions 60 and 62 respectively. The sleeve 66 has fixed thereto between its ends, a sealing disc 70 and the sleeve 68 has fixed thereto between its ends a sealing disc 72. Floatingly positioned on sleeve 66 on either side of sealing disc 70 and within valve housing 32 are valve disc members 74 and 76 having tapered seating surfaces 75 and 77 respectively, adapted to nest with the tapered seating surfaces 51 and 53 of the valve seats respectively whenever one of the valve discs is moved to a closed position. Positioned in like manner on sleeve 68 on either side of sealing disc 72 and within valve housing 34 are valve disc members 78 and 80 having tapered seating surface 79 and 81 respectively, adapted to nest with the tapered seating surfaces 55 and 57 of the valve seats respectively, whenever one of these valve discs is moved to a closed position. These valve discs may be made of any suitable material but preferably of a bronze alloy of sufficiently different composition than the valve seats to prevent seizing.

Each of the valve discs 74, 76, 78 and 80 has integral respectively therewith guide members 83, 85, 87, and 89. These guide members engage with the inner periphery of the valve seats serving to guide and center the valve disc members and maintain them in floating position around the sleeves, a small tolerance existing between the inner periphery of the valve seats and the adjacent portion of the guide members.

Valve disc stops or nuts 82 and 84 are threaded on portion 60 of the actuating rod at opposite ends of sleeve 66 and serve as stops for the valve discs 74 and 76 respectively. Valve disc stops or nuts 86 and 88 are threaded on portion 62 of the actuating rod at opposite ends of sleeve 68 and serve as stops for the valve discs 78 and 80 respectively. These nuts are so spaced that the valve discs 74 and 78 will open and close their respective ports in alternation with the opening and closing of the ports controlled by valve discs 76 and 80. Springs 90 and 92, positioned on opposite sides of sealing disc 70, surrounded the sleeve 66 and resiliently press valve discs 74 and 76 toward the stop nuts 82 and 84 respectively. Springs 94 and 96 positioned on opposite sides of sealing disc 72, surround the sleeve 68 and resiliently press valve discs 78 and 80 toward the stop nuts 86 and 88 respectively.

Respectively, surrounding the springs 90, 92, 94, and 96 are the flexible bellows-like diaphragm members 100, 102, 104, and 106. These diaphragms may be made of any metallic material, but are preferably made of stainless steel for anti-corrosive and wearing purposes. These diaphragm members each have one of their ends fastened to a disc through a nut, bolt and ring assembly as indicated by the reference numerals 108. The other ends of the diaphragms are fastened to the peripheral edge of sealing discs positioned between the valve discs to which the first ends of the diaphragms have been fastened. The resulting structure serves to form a flexible sealing element to seal off any fluid that would otherwise enter a valve housing by passing through the clearance between a sleeve and its surrounding valve disc when the valve disc is placed in a port closing position.

In operation, when the actuating rod member 58 is moved to the right, port 44 is closed by valve disc 76 and port 48 is closed by valve disc 80. Simultaneously, ports 42 and 46 are opened and fluid entering chamber 36 will flow through opened port 42, into valve housing 32, through the furnace chamber 14, into valve housing 34, through opened port 46 and out fluid chamber 40. When the actuating rod is moved to the left, port 42 is closed by valve disc 74 and port 46 is closed by valve disc 78. Simultaneously, ports 44 and 48 are opened and fluid entering chamber 38 will flow through opened port 48, into valve housing 34 through the furnace chamber 14 in a reverse direction into valve housing 32, through opened port 44 and out through fluid chamber 40.

By way of example and as shown in Figure 2 of the drawings, the valve mechanism in closing port 44 operates in the following manner:

When the actuating rod 58 is moved to the right the sleeve 66 surrounding the actuating rod and the sealing disc 70 fixed thereto will also move to the right since the sleeve is positioned between the two stop nuts 82 and 84 threaded on the rod. Movement of the sealing disc 70, causes the spring 92 to abut against the valve disc 76, floatingly surrounding the sleeve 66 and to move it to the right. When the valve disc 76, centered and guided by its member 85, reaches valve seat 52 in its rightward movement, it nests in the seat and can move no further to the right. Further movement of the rod 58 to the right to a desired limit compresses the spring 92 between the sealing disc 70 and the valve disc 76, and accordingly the valve disc 76 is nested tightly in its valve seat 52 under this spring pressure. As a result of this further movement of the rod 58 to the right, the sleeve 66 extends beyond the fluid chamber side of valve disc 76 and an annular fluid passage is formed around the sleeve 66 where the valve disc 76 floatingly surrounds this sleeve. However, fluid passing out through chamber 40 cannot re-enter the valve housing 32 since the flexible sealing diaphragm 102 fixed between the sealing disc 70 and the valve disc 76 prevents such re-entrance.

While the description and drawings illustrate particular embodiments of the invention, various modifications within the language of the description and claims are intended to be claimed herein.

The invention claimed is:

1. Fluid valve-control mechanism for reversing the flow of fluid in a system comprising a first valve housing having means for communicable connection at one point with a fluid system, a second valve housing in spaced alignment with said first valve housing and also having means for communicable connection at a different point with said fluid system, a first fluid chamber aligned on one side of the first valve housing adjacent that side of said first valve housing furthermost from said second valve housing, a second fluid chamber aligned on one side of the second valve housing adjacent that side of said second valve housing furthermost from said first valve housing, a third fluid chamber in common to and positioned between said first and second valve housings, a plurality of aligned valve housing ports with a port thereof positioned between each valve housing and the adjacent fluid chambers aligned on one side thereof and common thereto, a valve seat positioned in each of said valve ports, a pair of valve discs positioned within each of said valve housings for the valve ports for the chambers aligned on one side thereof and common thereto, adjustable spacing means for each pair of valve discs adapted to space the discs in such relationship that when one disc of a pair is engaged with its adjacent valve seat the other disc will be disengaged from its adjacent valve seat, spring means to resiliently press said valve discs against said valve seats when positioned in engagement therewith, actuating means connecting said pairs of valve discs for movement in unison, with the discs for the port for a chamber aligned on one side of one housing in sealing relation therewith while the disc for the port to the chamber common to the other housing is in seating relation therewith and sealing means to prevent fluids from leaking between a valve housing and an adjacent chamber when the connecting port is closed by a valve disc.

2. Fluid valve-control mechanism for reversing the flow of fluid in a system comprising a first valve housing having means for communicable connection at one point with a fluid system, a second valve housing in spaced alignment with said first valve housing and also having means for communicable connection at a different point with said fluid system, a first fluid chamber aligned adjacent that side of said first valve housing furthermost from said second valve housing, a second fluid chamber adjacent that side of said second valve housing furthermost from said first valve housing, a third fluid chamber in common to and positioned between said first and second valve housings, a plurality of aligned valve housing ports each port being positioned between a valve housing and an adjacent fluid chamber, a plurality of valve seats positioned in each of said valve ports, a valve actuating rod extending through said ports on the axis on which they are aligned, said actuating rod having spaced threaded portions falling substantially within the valve housings, sleeves surrounding a section of each threaded portion, a sealing disc fixed on each of said sleeves between its ends, valve discs floatingly positioned on opposite sides of each of said sealing discs and surrounding said sleeves within said housings, valve disc stops threaded on said actuating rod at opposite ends of said sleeves and so spaced that the valve discs will open and close the aligned ports in alternation with the movement of said actuating rod, springs positioned on opposite sides of said sealing discs and surrounding said sleeves to urge said valve discs away from said sealing discs, and diaphragms surrounding said springs to connect said sealing discs with adjacent valve discs to form flexible sealing elements between the same.

3. The apparatus of claim 2 and guide centering means fixed to each of said valve discs to center said discs with adjacent valve housing ports.

4. A fluid valve control mechanism for controlling the flow of fluid in a system comprising a valve housing, means for communicable connection with a fluid system, a first fluid chamber adjacent one side of said valve housing, a second fluid chamber adjacent the opposite side of said valve housing, a port positioned in one side of said valve housing between said housing and the first fluid chamber, a second port positioned in the opposite side of said valve housing between said housing and the second fluid chamber, a valve seat in each of said ports, a valve actuating rod extending through said ports, a pair of valve discs floatingly positioned on said rod within said valve housing, adjustable spacing means on said rod for said valve discs whereby said discs may be spaced in such relationship that when one disc of the pair is engaged with its adjacent valve seat the other disc will be disengaged from its adjacent valve seat, spring means to resiliently urge said valve discs against said valve seats when positioned in engagement therewith, and sealing means adapted to said actuating rod to prevent fluids from leaking between the valve housing and an adjacent chamber through the space between the floating discs and the rod when the connecting port is closed by a valve disc.

5. A fluid valve control mechanism for controlling the flow of fluid in a system comprising a valve housing having means for communicable connection with a fluid system, a first fluid chamber adjacent one side of said valve housing, a second fluid chamber adjacent the opposite side of said valve housing, a port positioned in one side of said valve housing between said housing and the first fluid chamber, a second port aligned with said first port and positioned in the opposite side of said valve housing between said housing and the second fluid chamber, a valve seat in each of said ports, a valve actuating rod extending through said ports on the axis on which the ports are aligned, said rod having a threaded portion falling substantially within the valve housing, a sleeve surrounding a section of said threaded portion, a sealing disc fixed to said sleeve between its ends, valve discs floatingly positioned on opposite sides of said sealing disc and surrounding said sleeves within said housing, guide centering means fixed to each of said valve discs to center said discs with its adjacent valve seat, valve disc stops threaded on said actuating rod at opposite ends of said sleeve and so spaced that the valve discs will open and close the aligned ports in alternation with the movement of said actuating rod, springs positioned on opposite sides of said sealing disc and surrounding said sleeve to urge said valve discs away from said sealing disc, and diaphragms surrounding said springs to connect said sealing disc with adjacent valve discs to form flexible sealing elements between the same.

6. A valve control mechanism comprising a valve housing, a port in said housing, a valve seat in said port, a valve actuating rod extending through said port, said rod having a threaded section falling substantially within said housing, a sleeve surrounding a portion of the threaded section of said rod, a sealing disc fixed to and movable with said sleeve at a region opposite said port, a disc stop nut threaded on said rod adapted to abut the sleeve adjacent said port, a valve disc for said port floatingly mounted on said sleeve, a spring interposed between said sealing disc and said valve disc adapted to urge said valve disc away from said sealing disc, and a sealing diaphragm surrounding said spring and sleeve and connecting said sealing disc with the valve disc to form a flexible sealing element between the same.

7. A valve for use with a regenerative furnace having a regenerative space, said valve comprising a control mechanism adapted for communication with the regenerative space to control the flow of fluid therein, said valve control mechanism comprising a first valve housing having port means adapted for communicable connection with the regenerative space, a second valve housing in spaced alignment with said first valve housing and having port means adapted for communicable connection with the regenerative space, a first fluid chamber aligned adjacent that side of said first valve housing furthermost from said second valve housing, a second fluid chamber adjacent that side of said second valve housing furthermost from said first valve housing, a third fluid chamber in common to and positioned between said first and second valve housings, a plurality of aligned valve housing ports connecting said valve housings with adjacent fluid chambers, a plurality of valve seats positioned in said valve ports, a valve actuating rod extending through said ports on the axis on which they are aligned, said actuating rod having spaced threaded portions falling substantially within the valve housings, a sleeve surrounding a section of each threaded portion, a sealing disc fixed on each of said sleeves between its ends, valve discs floatingly positioned on opposite sides of each of said sealing discs and surrounding said sleeve within said housings, valve disc stops threaded on said actuating rod at opposite ends of said sleeves and so spaced that the valve discs will open the ports between one housing and the common chamber and the other housing and the chamber furthermost from said one housing, and close the ports between the other housing and the common chamber and the one housing and chamber furthermost from the other chamber in alternation and in unison with the movement of said actuating rod, springs positioned on opposite sides of said sealing discs and surrounding said sleeves to urge said valve discs away from said sealing discs, and diaphragms surrounding said springs to connect said sealing discs with adjacent valve discs to form flexible sealing elements between the same.

References Cited in the file of this patent

UNITED STATES PATENTS

| 634,907 | Newell | Oct. 17, 1899 |
| 766,116 | Rawl et al. | July 26, 1904 |
| 2,122,398 | Harrison | July 5, 1938 |
| 2,331,503 | Ray | Oct. 12, 1943 |